Figure 1:
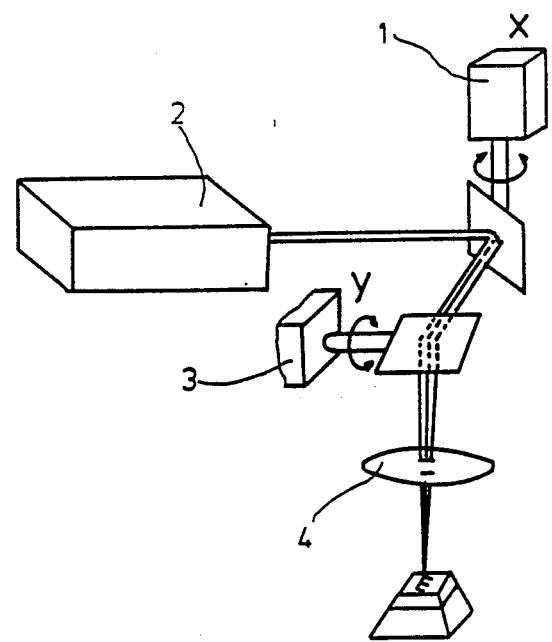

United States Patent [19]

Foltin et al.

[11] Patent Number: 4,959,406

[45] Date of Patent: Sep. 25, 1990

[54] LASER-WRITABLE MATERIAL

[75] Inventors: Eckard Foltin, Sinzig-Bodendorf; Hans-Werner Depcik, Duesseldorf; Karl Huff, Dormagen; Alfred Pischtschan, Kuerten; Mehmet C. Yesildag, Leverkusen; Reiner Erkelenz, Cologne, all of Fed. Rep. of Germany

[73] Assignee: Bayer Aktiengesellschaft, Leverkusen, Fed. Rep. of Germany

[21] Appl. No.: 306,677

[22] Filed: Feb. 6, 1989

[30] Foreign Application Priority Data

Feb. 18, 1988 [DE] Fed. Rep. of Germany ....... 3805056

[51] Int. Cl.$^5$ ............................ C08K 3/04; C08K 3/22; C08K 7/14

[52] U.S. Cl. .................................... 524/413; 430/541; 430/945; 524/496; 524/564; 524/543; 524/556; 524/560; 524/568; 524/571; 524/577; 524/589; 524/594; 524/597; 524/601; 524/602; 524/607; 524/611

[58] Field of Search .............. 524/413, 430, 496, 504, 524/577, 568, 589, 560, 542, 556, 64; 430/945

[56] References Cited

U.S. PATENT DOCUMENTS

| 4,596,409 | 6/1986 | Holbein et al. | 430/946 |
| 4,607,073 | 8/1986 | Sakashita et al. | 524/430 |
| 4,788,129 | 11/1988 | Bouldin et al. | 430/945 |
| 4,812,345 | 3/1989 | Imai et al. | 430/945 |

FOREIGN PATENT DOCUMENTS

664898 12/1965 Belgium.

OTHER PUBLICATIONS

Patent Abstracts of Japan, Band 4, Nr. 101 (C-19)[583], 1980, 50 C 19; and JP-A-55 62 937 (Denki Kagaku K.K.) 1980.

Patent Abstracts of Japan, Band 9, Nr. 260 (C-309)[1983], 1985; and JP-A-60 110 737 (Toyo Ink Seiso K.K.) 1985.

*Primary Examiner*—Allan M. Lieberman
*Attorney, Agent, or Firm*—Connolly and Hutz

[57] ABSTRACT

Plastic containing small amounts of titanium dioxide and, if appropriate, carbon black and an additive which reduces the tracking resistance, for the production of laser-writable mouldings.

3 Claims, 1 Drawing Sheet

LASER-WRITABLE MATERIAL

European Patent Application 0,190,997 discloses that high-molecular-weight organic material, i.e. synthetic resins or plastics, can be written by adding to them an additive which causes discolouration and then treating a moulding made from the material imagewise with a laser beam.

It has been found that particularly high-contrast images, for example characters, are obtained if the plastic contains 0.001 to 2.2% by weight of titanium dioxide, if appropriate up to 0.1% by weight of a carbon black having an average particle diameter of from 30 to 120 nm, and, if appropriate, an additive which reduces the tracking resistance or arc resistance. In general, the writing is dark, for example black, and the moulding itself is pale coloured, for example pale grey.

The invention thus relates to a synthetic material which contains 0.001 to 2.2% by weight of titanium dioxide, if appropriate up to 0.1% by weight of a carbon black having an average particle diameter of from 30 to 120 nm, and if appropriate an additive which reduces the tracking resistance. The invention furthermore relates to the use of this plastic for the production of laser-written mouldings and to laser-written mouldings made from this plastic.

Plastics which are suitable according to the invention are, for example, polyethylene, polypropylene, polyisobutylene, polystyrene, poly(vinyl chloride), poly(vinylidene chloride), poly(vinyl acetates), polyacrylonitrile, polyacrylates and polymethacrylates, polybutadiene (and the copolymers thereof), ABS plastics, ethylene-vinyl acetate copolymers, polyesters, in particular high-molecular-weight esters of aromatic polycarboxylic acids with polyfunctional alcohols, for example poly(ethylene terephthalate) and poly(butylene terephthalate) or polyfunctional phenols, polyamides, polyimides, polyamideimides, liquid crystal polymers, aromatic polycarbonates, polyurethanes, polyethers, such as poly(phenylene oxide), poly(phenylene sulphides), polyacetates, products of the condensation of formaldehyde with phenols (phenolic plastics), products of the condensation of formaldehyde with urea, thiourea and melasine (aminoplastics), epoxy resins, polyphenols, alkyd resins and maleate resins. It is of course also possible to use mixtures. Linear polyesters, polystyrene, polyolefins, such as polyethylene and polypropylene, ABS, in particular graft polymers of styrene and acrylonitrile on polybutadiene, polyamides, aromatic polycarbonates, poly(butylene terephthalate), poly(ethylene terephthalate), poly(phenylene sulphide), polyacrylates and blends of these materials are particularly preferred. Some of these materials have liquid crystal structure.

Suitable carbon blacks are, in particular, lamp blacks.

Particularly suitable additives which reduce the tracking resistance are, for example, halogen-containing compounds, antimony compounds (such as antimony trioxide), bromine compounds, hydroxides, general compounds of an aliphatic, cycloaliphatic, aromatic and aromatic-aliphatic nature (for example tetrabromobisphenol A) or glass fibres. Polycarbonates are also suitable.

Amounts from 0.01 to 20% by weight are preferred.

The additives may be added to the plastics by customary methods, for example by compounding in screw kneaders or in a Buss Ko-kneader.

In order to produce laser-written mouldings, for example keys for typewriters, the appropriate moulding is first produced in a customary manner from the additive-containing plastics and then written with a laser beam. This can be carried out, for example, as follows:

For writing, the light beam of a Nd-YAG laser, of wavelength 1.064 $\mu$m, is used. The schematic course of laser writing is shown by FIG. 1. In this figure, (1) denotes a galvanometer, (2) denotes the laser head, (3) denotes a galvanometer and (4) denotes a focusing lens.

The light beam is routed via deflector mirrors and describes any two-dimensional geometric form desired.

The written mouldings obtained according to the invention are distinguished by particularly good contrast between the untreated parts and the parts treated with the laser beams.

EXAMPLE 1

$TiO_2$ is distinguished by its high covering power for colouring pale base tones. In the case of laser writing, the pigment remains in the written area and thus prevents complete blackening. The contrast therefore decreases with increasing $TiO_2$ content. As the $TiO_2$ content increases, it should also be ensured that the penetration depth of the colouring decreases and less surface modification occurs. In the writing operation, this becomes visible through a focal spot which becomes paler and audible acoustically through increasing loudness.

In the example given, $TiO_2$ in various proportions was added to an ABS graft polymer (Novodur P2M/natural).

DEFINITION OF CONTRAST RATIO:

In order to determine the contrast ratio, the background luminance (BL) and the character luminance (CL) are measured. The luminance is specified in $cd/m^2$.

In this case, diffuse illumination having an illuminance of 500 lux $+/-10\%$ should be observed as a side constraint. The contrast ratio is formed from BL:CL.

| Pigmentation: Novodur P2M/nat. | BL | CL | Contrast ratio |
|---|---|---|---|
| +0.5% $TiO_2$ | 142 | 22 | 6.5:1 |
| +1% $TiO_2$ | 148 | 33 | 4.5:1 |
| +1.5% $TiO_2$ | 157 | 45 | 3.5:1 |

$TiO_2$ causes both the background and the laser-treated area to become clearly paler. The contrast ratio decreases with increasing $TiO_2$ content.

EXAMPLE 2

In these experiments, various types of carbon black were investigated with regard to their effectiveness in laser writing.

A colour recipe containing 1.0% of $TiO_2$ and in each case 0.01% of the carbon black types mentioned below was mixed into Novodur P2M/natural.

Printex 60
Lamp Black 101
Black Pearls 900

The average particle sizes (PS) of the carbon blacks:

| | |
|---|---|
| Printex 60 | PS = 21 nm |
| Lamp Black 101 | PS = 95 nm |

| Black Pearls 900 | PS = 15 nm |
| --- | --- |

RESULTS:

In this series, the contrast is clearly better in the colour mixture containing Lamp Elack 101 compared with the other types of carbon black, i.e. the characters produced were significantly darker.

We claim:

1. A composition which comprises
    (i) a plastic material,
    (ii) 0.001 to 2.2% by weight of $TiO_2$,
    (iii) no more than 0.1% by weight of carbon black having an average particle diameter of from 30 to 120 nm, and
    (iv) 0.01 to 20% by weight of a tracking resistance reducing additive which is a halogen-containing compound, an antimony compound, a hydroxide or glass fibers, wherein said plastic material comprises polyethylene, polypropylene, polyisobutylene, polystyrene, polyvinyl chloride, polyvinylidene chloride, polyvinyl acetates, polyacrylonitrile, polyacrylates, polymethacrylates, polybutadiene, copolybutadiene, ABS plastics, ethylene-vinyl acetate copolymers, high-molecular-weight esters of aromatic polycarboxylic acids with polyfunctional alcohols, polyamides, polyimides, polyamideimides, liquid crystal polymers, aromatic polycarbonates, polyurethanes, polyethers, polyphenylene sulphides, polyacetates, products of the condensation of formaldehyde with phenols, products of the condensation of formaldehyde with urea, thiourea and melamine aminoplastics, epoxy resins, polyphenols, alkyd resins, maleate resins or mixtures thereof.

2. Use of the composition according to claim 1 for the production of laser-written mouldings.

3. Laser-written mouldings made from the composition according to claim 1.

* * * * *